(12) United States Patent
He

(10) Patent No.: US 11,084,670 B2
(45) Date of Patent: Aug. 10, 2021

(54) SORTING DEVICE

(71) Applicants: Beijing Jingdong Shangke Information Technology Co., Ltd., Beijing (CN); Beijing Jingdong Century Trading Co., Ltd., Beijing (CN)

(72) Inventor: Weiquan He, Beijing (CN)

(73) Assignee: Beijing Jingdong Qianshi Technology Co., Ltd., Beijing (CN)

(*) Notice: Subject to any disclaimer, the term of this patent is extended or adjusted under 35 U.S.C. 154(b) by 0 days.

(21) Appl. No.: 16/498,242

(22) PCT Filed: Apr. 9, 2018

(86) PCT No.: PCT/CN2018/082285
§ 371 (c)(1),
(2) Date: Sep. 26, 2019

(87) PCT Pub. No.: WO2018/223762
PCT Pub. Date: Dec. 13, 2018

(65) Prior Publication Data
US 2020/0017319 A1 Jan. 16, 2020

(30) Foreign Application Priority Data
Jun. 8, 2017 (CN) .......................... 201710428400.6

(51) Int. Cl.
*B65G 65/23* (2006.01)
*B65G 41/02* (2006.01)
(Continued)

(52) U.S. Cl.
CPC ............ *B65G 65/23* (2013.01); *B65G 41/02* (2013.01); *B65G 47/1485* (2013.01); *B65G 47/96* (2013.01); *B66F 9/19* (2013.01)

(58) Field of Classification Search
CPC .... B65G 65/23; B65G 41/02; B65G 47/1485; B65G 47/96; B66F 9/19
See application file for complete search history.

(56) References Cited

U.S. PATENT DOCUMENTS

| | | | |
|---|---|---|---|
| 4,209,959 A | 7/1980 | Bachman et al. | |
| 5,006,033 A * | 4/1991 | McConnell | B60P 1/6454 |
| | | | 298/14 |

(Continued)

FOREIGN PATENT DOCUMENTS

| | | |
|---|---|---|
| CN | 205060986 U | 3/2016 |
| CN | 205575107 U | 9/2016 |

(Continued)

OTHER PUBLICATIONS

International Search Report for PCT/CN2018/082285, dated Jul. 16, 2018, 3 pages.

*Primary Examiner* — Saul Rodriguez
*Assistant Examiner* — Willie Berry, Jr.
(74) *Attorney, Agent, or Firm* — Blank Rome LLP

(57) ABSTRACT

Provided is a sorting device, comprising a guide rail and a material vehicle moving on the guide rail. A plurality of sorting ports are disposed on both sides of the guide rail, and at least one electromagnet is disposed at a position of the guide rail corresponding to a sorting port; the material vehicle includes a vehicle frame, a tray, at least one magnet and at least two elastically telescopic pieces; the vehicle frame is used to bear the tray, and the tray is rotatably connected to the vehicle frame; the magnet is disposed on a surface of the tray opposite to the material loading surface, and the magnet is connected to the electromagnet in an attraction way, and the elastically telescopic pieces and the tray, for maintaining the transportation state or resetting the tray after the unloading state.

13 Claims, 6 Drawing Sheets

(51) Int. Cl.
*B65G 47/14* (2006.01)
*B65G 47/96* (2006.01)
*B66F 9/19* (2006.01)

(56) References Cited

U.S. PATENT DOCUMENTS

2012/0230803 A1\* 9/2012 Goedken ................. B65F 3/043
 414/408
2018/0170690 A1 6/2018 Lykkegaard

FOREIGN PATENT DOCUMENTS

| CN | 205998682 U | 3/2017 |
| CN | 107055121 A | 8/2017 |
| CN | 206767141 U | 12/2017 |
| DE | 2542827 A1 | 4/1977 |
| WO | WO-2016/206695 A1 | 12/2016 |

\* cited by examiner

SORTING DEVICE

CROSS-REFERENCE TO RELATED APPLICATION

This patent application is a national stage of International Application No. PCT/CN2018/082285, filed on Apr. 9, 2018, which claims priority from Chinese Application No. 201710428400.6, filed on Jun. 8, 2017. The entire content of these applications are hereby incorporated by reference.

TECHNICAL FIELD

The present disclosure relates to the field of logistics technology, specifically to the field of parcel sorting technology, and more specifically to a sorting device.

BACKGROUND

With the development of society, demands for production and living materials increase greatly, and the quantity and frequency of commodity circulation increase rapidly, which promotes the development of the express logistics industry. The emergence of the automatic sorting line has greatly improved the efficiency of material circulation. A tilt-tray sorter, as an important sorting device, is widely applied in industries such as the food and drug industry, the baggage handling industry, the postal express industry and the industrial logistics industry.

The existing offline tilt sorter refers to a tilt-tray sorter with a power device for tilting a tray, the power device being disposed outside the sorting line. This offline tilt-tray sorter has a problem in a transportation state that the tray is easily tilt and is hard to be reset after goods are unloaded at a sorting port.

SUMMARY

The purpose of the present disclosure is to propose a sorting device to resolve the technical problems mentioned in the background.

Embodiments of the present disclosure provide a sorting device. The a sorting device includes: a guide rail and a material vehicle moving on the guide rail. A plurality of sorting ports are provided on both sides of the guide rail, and at least one electromagnet is provided at a position of the guide rail corresponding to a sorting port. The material vehicle includes a vehicle frame, a tray, at least one magnet and at least two elastically telescopic pieces. The vehicle frame is used to bear the tray, the tray includes a material loading surface and is for loading materials, and the tray is rotatably connected to the vehicle frame. The magnet is disposed on a surface of the tray opposite to the material loading surface, and the magnet is connected to the electromagnet in an attraction way, to switch the material vehicle between a transportation state and an unloading state. The elastically telescopic pieces are connected to the vehicle frame and the tray, for maintaining the transportation state or resetting the tray after the unloading state.

In some embodiments, the vehicle frame includes a first transverse beam, and a second transverse beam, disposed opposite each other. The first transverse beam is provided with a first support and a second support. The first support is rotatably connected to the tray, and the second support is rotatably connected to the elastically telescopic pieces.

In some embodiments, the first transverse beam is provided with a plurality of first supports. The plurality of first supports are collinear, and a plane formed of a line where the plurality of first supports are located and a center line of the guide rail is perpendicular to the first transverse beam.

In some embodiments, the first transverse beam is provided with a plurality of second supports, and the plurality of second supports are symmetrically distributed with respect to the center line of the guide rail.

In some embodiments, the material loading surface is a curved surface, and the curved surface is symmetrical along a cross section perpendicular to the center line of the guide rail with respect to the center line of the guide rail.

In some embodiments, the guide rail includes a bearing surface. The material vehicle further includes a walking wheel, the walking wheel being fixedly connected to the first transverse beam and the second transverse beam. The walking wheel is in contact with the bearing surface, to allow the material vehicle to move on the guide rail.

In some embodiments, the guide rail further includes a side surface perpendicular to the bearing surface. The material vehicle further includes a guide wheel, the guide wheel being fixed to the second transverse beam. The guide wheel is in contact with the side surface, to allow the material vehicle to move along the guide rail.

In some embodiments, a linear motor is disposed in the guide rail, and the material vehicle further includes a power acquisition board. The linear motor supplies power to the material vehicle through the power acquisition board, to drive the material vehicle to move on guide rail.

In some embodiments, an even number of electromagnets are disposed at positions of the guide rail corresponding to the sorting ports, the even number of electromagnets are evenly distributed on both sides of the guide rail, and the electromagnets are connected to a power supply.

In some embodiments, the material vehicle includes a plurality of permanent magnets, and the plurality of permanent magnets are symmetrical with respect to the center line of the guide rail.

According to the sorting device provided by the embodiments of the present disclosure, an electromagnet is provided at a position of the guide rail corresponding to a sorting port, and at the same time, the magnet is provided on the surface of the tray of the material vehicle opposite to the material loading surface, so that the magnet may be connected to the electromagnet in an attraction way. Thus, it is implemented that the material vehicle is switched between the transportation state and the unloading state. Meanwhile, the vehicle frame of the material vehicle is connected with the tray using the elastically telescopic pieces, and thus the transportation state of the material vehicle can be effectively maintained or the unloading state can be realized in time. According to the sorting device in the embodiments, the tilting or resetting of the tray is implemented by using the magnetic force, and the resetting of the tray is implemented by using the elastically telescopic pieces, and at the same time, the balance of the tray is maintained, which makes the resetting of the tray easier, and makes the tray move stably and not easily tilted.

BRIEF DESCRIPTION OF THE DRAWINGS

After reading detailed descriptions of non-limiting embodiments given with reference to the following accompanying drawings, other features, objectives and advantages of the present disclosure will be more apparent:

FIG. 1b is a schematic structural diagram of the sorting device illustrated in FIG. 1a;

FIG. 2b is an isometric view of the sorting device illustrated in FIG. 2a;

FIG. 2c is a schematic structural diagram of an unloading state of the sorting device illustrated in FIG. 2a; and FIG. 2d is a schematic structural diagram of another unloading state of the sorting device illustrated in FIG. 2a.

DETAILED DESCRIPTION OF EMBODIMENTS

The present disclosure will be described below in detail by combining the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1A:
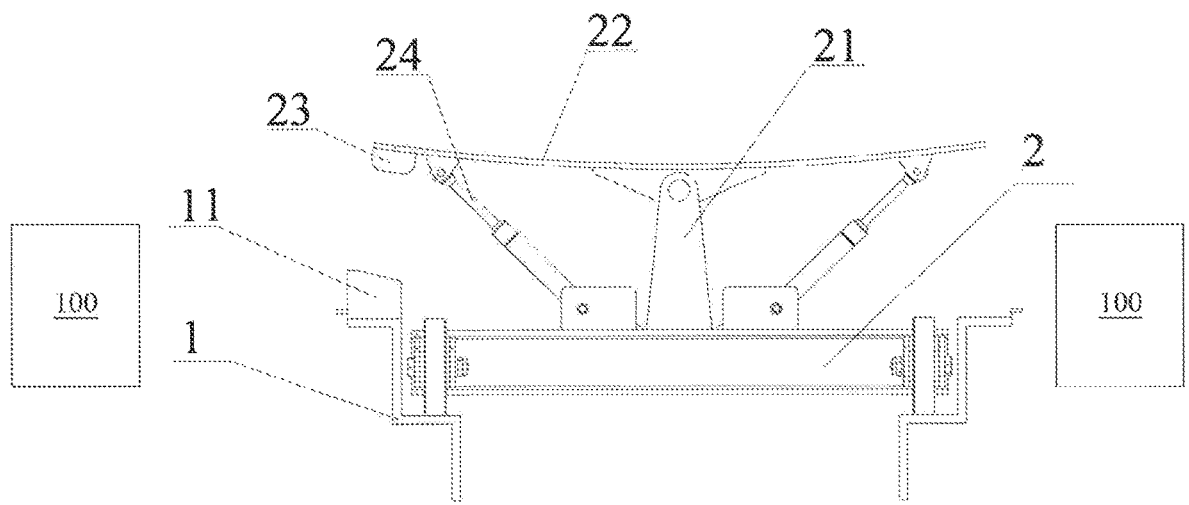
FIG. 1a is a schematic structural diagram of an embodiment of a sorting device according to the present disclosure.
Figure 1B:
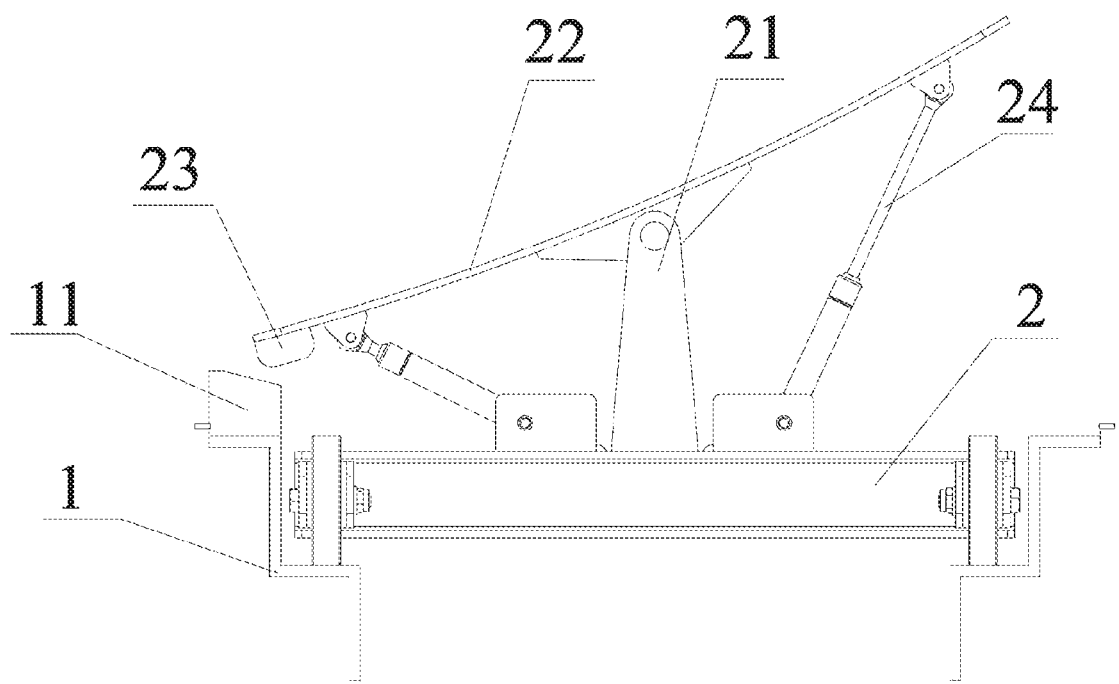

FIG. 1a is a schematic structural diagram of an embodiment of a sorting device according to the present disclosure, and FIG. 1b is a schematic structural diagram of an unloading state of the sorting device illustrated in FIG. 1a. As shown in FIG. 1a, the sorting device in this embodiment includes a guide rail 1 and a material vehicle 2 moving on the guide rail 1. The guide rail 1 may be a double-line rail as shown in FIGS. 1a and 1b, or may be a single-line rail, which is not limited in this embodiment.

A plurality of sorting port (100) may be provided on both sides of the guide rail 1. At least one electromagnet 11 is provided at positions of the guide rail 1, the positions corresponding to the sorting ports. In this embodiment, a position corresponding to the sorting ports may be a position directly facing the sorting ports, or may be a position directly facing a conveyor belt transported to the sorting ports. The electromagnet 11 may be an alternating-current electromagnet or a direct-current electromagnet.

The material vehicle 2 includes a vehicle frame 21, a tray 22, at least one magnet 23 and at least two elastically telescopic pieces 24. The vehicle frame 21 is used to bear the tray 22, the tray 22 includes a material loading surface, and the material loading surface may be an upward surface of the tray 22 for loading material. The material may be a loadable item such as a parcel or an article. The tray 22 is rotatably connected (i.e., hinged) to the vehicle frame 21. When the tray 22 rotates relative to the vehicle frame 21, the material vehicle may be switched between a transportation state and an unloading state.

The magnet 23 may be provided on the surface of the tray 22 opposite to the material loading surface, and the magnet 23 may be connected to the electromagnet 11 in an attraction way, to implement the tilting and resetting of the tray 22 of the material vehicle 2. That is, when the magnetic pole close to the magnet 23 generated by electrifying the electromagnet 11 and the magnetic pole of the magnet 23 close to the electromagnet 11 are unlike poles, the magnet 23 and the electromagnet 11 attract each other, implementing the tilting of the tray 22. Thus, the material loaded on the tray 22 may enter a sorting port or the conveyor belt connected to the sorting port. Such a state is the unloading state, as shown in FIG. 1b. When the magnetic pole close to the magnet 23 generated by electrifying the electromagnet 11 and the magnetic pole of the magnet 23 close to the electromagnet 11 are like poles, the magnet 23 and the electromagnet 11 repel each other, and thus the tray 22 is reset. Therefore, material may be loaded onto the tray 22 again. Such a state is the transportation state, as shown in FIG. 1a.

The elastically telescopic pieces 24 are connected to the vehicle frame 21 and the tray 22, for maintaining the transportation state or implementing the resetting the tray after the unloading state. For ease of understanding, the working principle of the elastically telescopic pieces 24 are further described below in combination with FIG. 1b. In the transportation state (as shown in FIG. 1a), the elastically telescopic pieces 24 may be in a normal state, i.e., not compressed or stretched. In the unloading state (as shown in FIG. 1b), since the magnet 23 and the electromagnet 11 attract each other, the elastically telescopic piece 24 close to the magnet 23 is in a compressed state, and the elastically telescopic piece 24 away from the magnet 23 is in a stretched state. In this embodiment, the elastically telescopic piece 24 may be made of a spring or other elastic materials having elasticity.

It may be understood that, in this embodiment, the resetting of the tray 22 may be implemented depending on the repulsive force between the magnet 23 and the electromagnet 11, or may be implemented depending on the elastic force of the elastically telescopic piece 24 itself. When the material vehicle 2 moves at a fast speed, the resetting of the tray 22 may be implemented using the elastic force only. When the material vehicle 2 moves at a slow speed, the resetting of the tray 22 may be implemented using the magnetic force and the elastic force simultaneously.

According to the sorting device provided by the above embodiment of the present disclosure, an electromagnet is provided at a position of the guide rail corresponding to a sorting port, and at the same time, the magnet is provided on the surface of the tray of the material vehicle opposite to the material loading surface, so that the magnet may be connected to the electromagnet in the attraction way. Thus, it is implemented that the material vehicle is switched between the transportation state and the unloading state. Meanwhile, the vehicle frame of the material vehicle is connected with the tray using the elastically telescopic pieces, and thus the transportation state of the material vehicle can be effectively maintained or the unloading state can be realized in time. According to the sorting device in this embodiment, the tilting or resetting of the tray is implemented by using the magnetic force, so that the tray is reset using the elastically telescopic pieces, and at the same time, the balance of the tray is maintained, which makes the resetting of the tray easier, and makes the tray move stably and not easily tilted.

In some alternative implementations of this embodiment, the material loading surface of the tray 22 is a curved surface, and the curved surface is symmetrical along a cross section perpendicular to the center line of the guide rail 1 with respect to the center line in this implementation, the center line of the guide rail 1 may be coincided with the center line of the material vehicle as a whole, the curved surface along the cross section perpendicular to the center line is a curve, and the curve is symmetrical with respect to the center line. In this way, it is ensured that the lowest point of each cross section is located on the center line. Thus, when the material is placed on the tray 22, it may be avoided that the material is easily slipped and fell due to the problem of the tray itself.

Figure 2A:
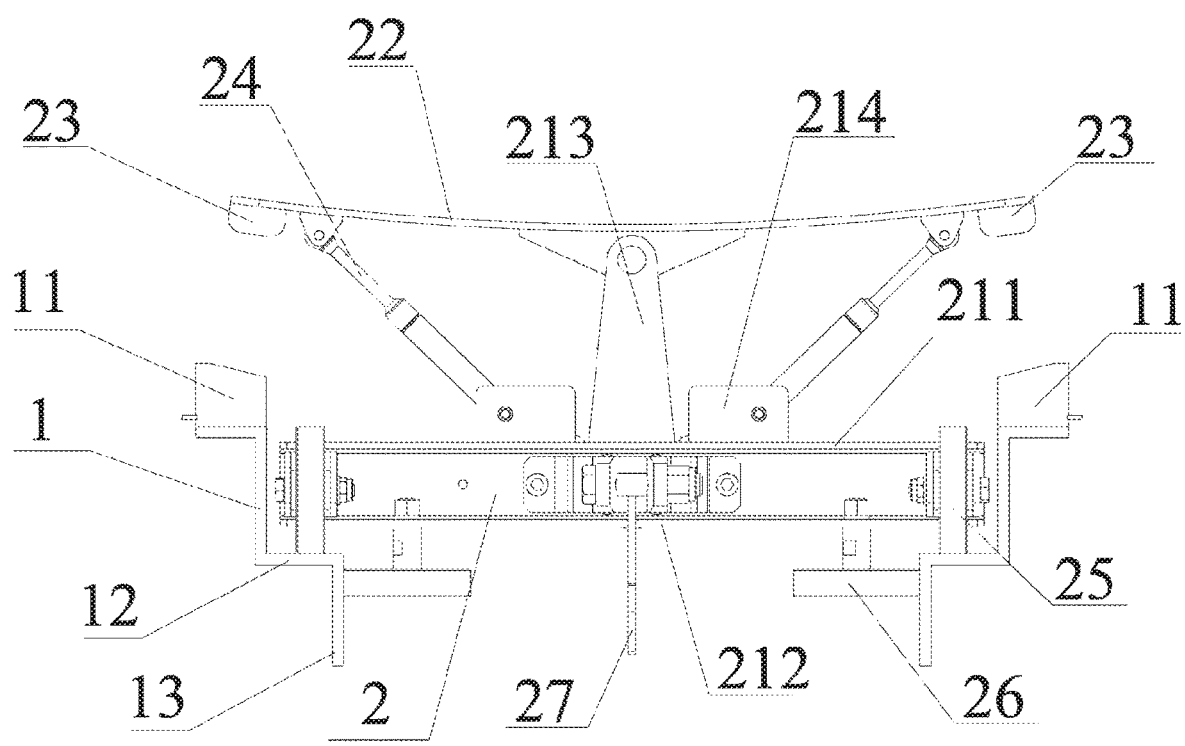
FIG. 2a is a schematic structural diagram of another embodiment of the sorting device according to the present disclosure.
Figure 2B:
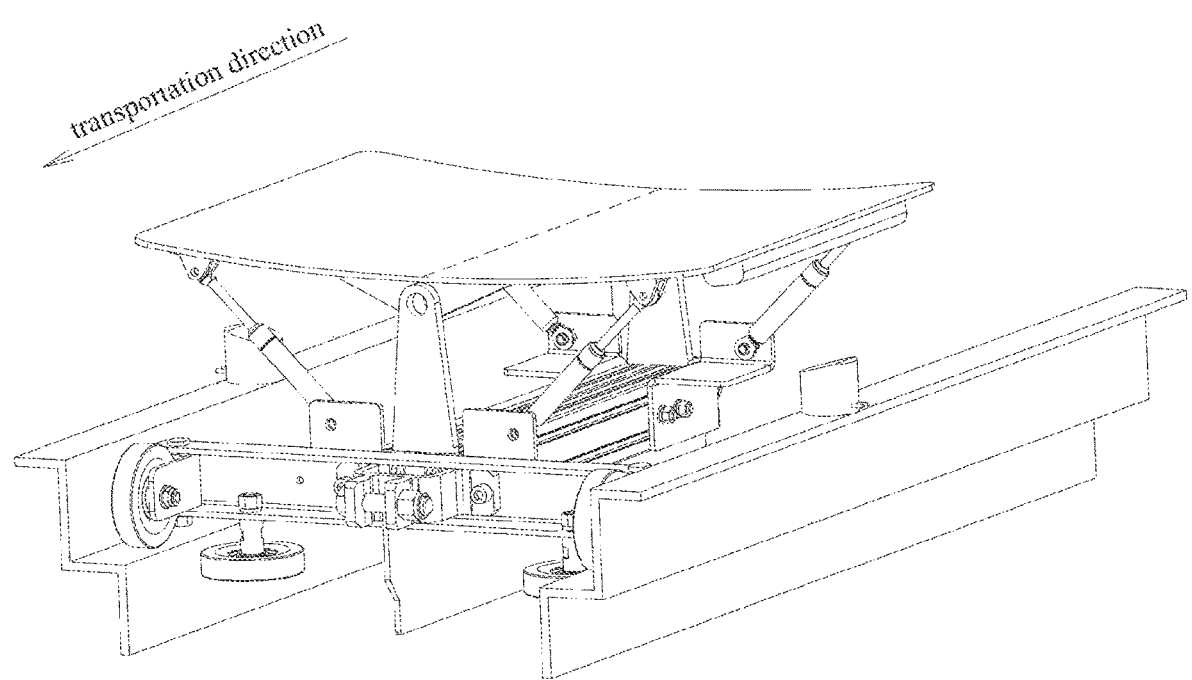
Figure 2C:
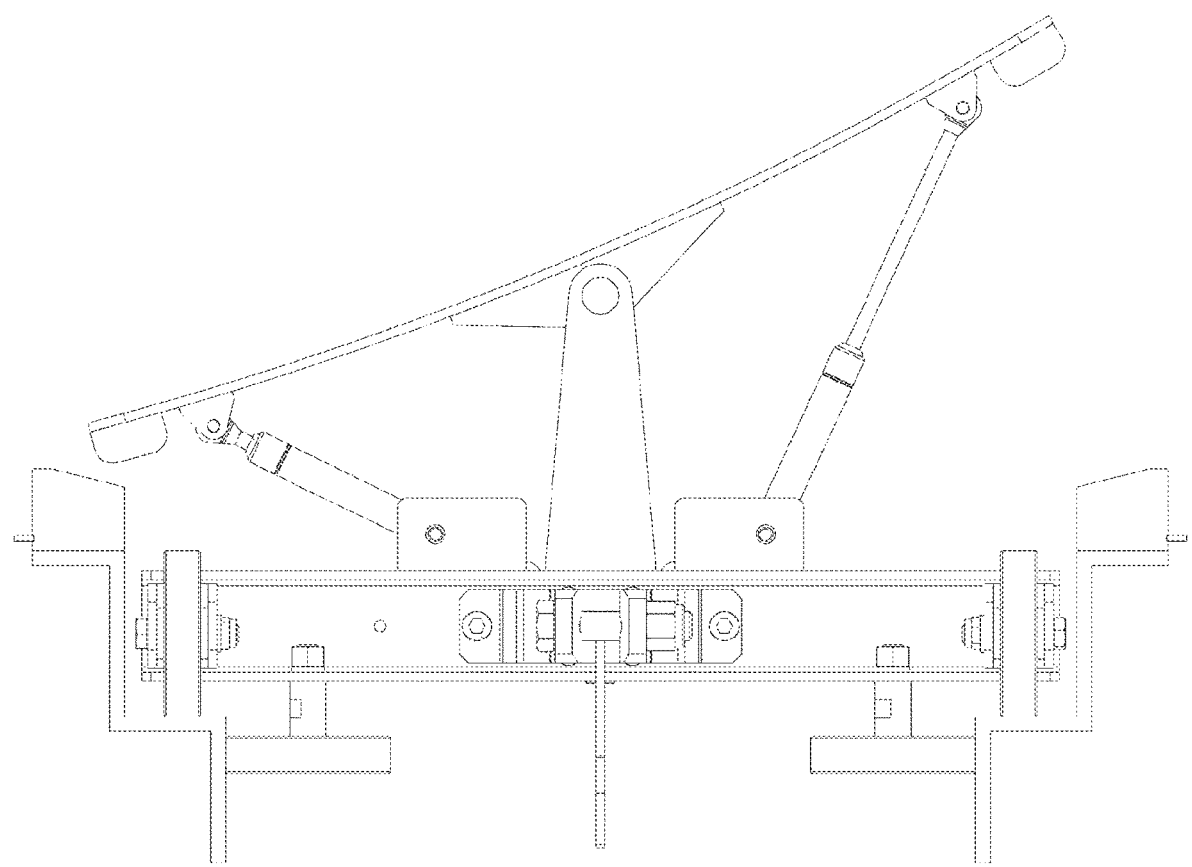
Figure 2D:
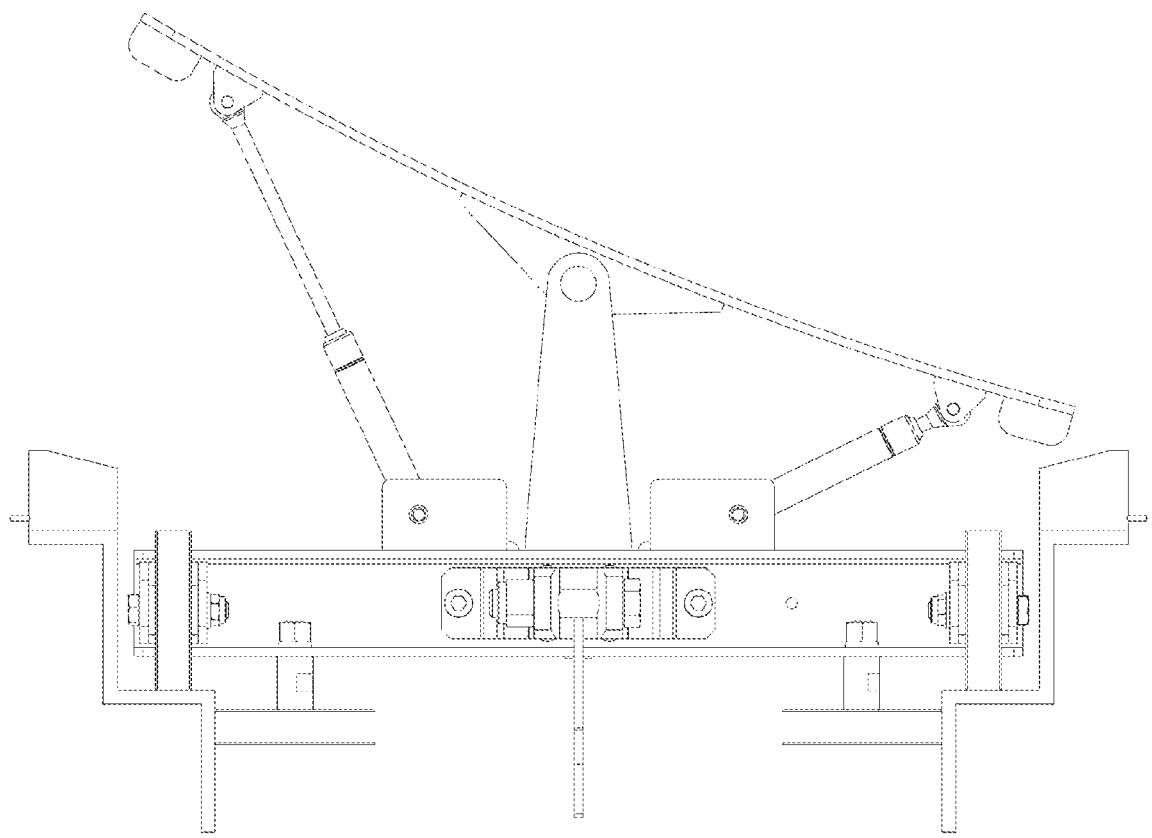

FIG. 2a is a schematic structural diagram of another embodiment of the sorting device according to the present disclosure. FIG. 2b is an isometric view of the sorting device illustrated in FIG. 2a. FIG. 2c is a schematic structural diagram of an unloading state of the sorting device illustrated in FIG. 2a. FIG. 2d is a schematic structural diagram of another unloading state of the sorting device illustrated in FIG. 2a.

As shown in FIG. 2a, the sorting device in this embodiment includes the guide rail 1 and the material vehicle 2. An even number of electromagnets 11 are disposed at positions of the guide rail, the positions corresponding to the sorting ports. The even number of electromagnets 11 are evenly distributed on both sides of the guide rail, and electromagnets 11 at the given one side are connected to a given one power supply (not shown in FIG. 2a). In this way, the magnetic poles generated at the same time by the electromagnets 11 at the given one side may be the same, which increases the attractive force or repulsive force of the electromagnet 11 to a permanent magnet 23 installed on the tray 22, and makes the tilting action of the tray 22 more rapid, thus improving the sorting efficiency.

Correspondingly, the material vehicle 2 may include a plurality of permanent magnets 23, and the plurality of permanent, magnets 23 may also be symmetrical with respect to the center line of the guide rail 1. In this way, the plurality of permanent magnets 23 may be attracted or repelled by a plurality of electromagnets 11, thus implementing the tilting of the tray 22. In this embodiment, the number of power supplies may be reduced and the number of control devices controlling the power supplies may be reduced at the same time, by installing a permanent magnet 23 on the material vehicle instead of adopting an electromagnet.

In this embodiment, the vehicle frame 21 of the material vehicle 2 may further include a first transverse beam 211 and a second transverse beam 212, and the first transverse beam 211 and the second transverse beam 212 are disposed opposite each other. The first transverse beam 211 may also be provided with a first support 213 and a second support 214, the first support 213 is used for rotatably connecting to the tray 22, and the second support 214 is used for rotatably connecting to the elastically telescopic pieces 24. It may be understood that a connecting piece connecting with the first support 213 and the elastically telescopic piece 24 is disposed on the surface of the tray 22 opposite to the material loading surface.

In some alternative implementations of this embodiment, the first transverse beam 211 may be provided with a plurality of first supports 213, and the plurality of first supports 213 are collinear. The plane formed by the line where the first supports 213 are located and the center line of the guide rail 1 is perpendicular to the first transverse beam 211. In combination with FIG. 2b, the line where the plurality of first supports 213 are located is directly below the center line of the tray 22 (the dashed line in FIG. 2b), which not only facilitates the balance of the tray 22, but also facilitates the tilting of the tray 22 to both sides.

In some alternative implementations of this embodiment, the first transverse beam 211 may further be provided with a plurality of second supports 214, and the plurality of second supports 214 are symmetrically distributed with respect to the center line of the guide rail 1. In than way, a plurality of elastically telescopic pieces 24 may also be symmetrically distributed with respect to the center line of the guide rail 1, which facilitates the balance of the tray 22.

In this embodiment, the guide rail 1 may further include a bearing surface 12, and the material vehicle 2 may further include a walking wheel 25. The walking wheel 25 is fixedly connected to the first transverse beam 211 and the second transverse beam 212, and the walking wheel 25 is in contact with the bearing surface 12, such that the material vehicle 2 moves on the guide rail 1.

In this embodiment, the guide rail 1 may further include a side surface 13, and the side surface 13 is perpendicular to the bearing surface 12. The material vehicle 2 may further include a guide wheel 26, and the guide wheel 26 is fixed to the second transverse beam 212. The guide wheel 26 is in contact with the side surface 13 such that the material vehicle 2 moves along the guide rail 1. When the guide rail 1 is not a straight guide rail, the guide wheel 26 may effectively guide the material vehicle 2 to move along the guide rail 1, thereby reducing the force between the guide rail 1 and the walking wheel 25, and reducing the wear of the walking wheel 25.

In this embodiment, a linear motor (not shown in FIG. 2a) is further provided in the guide rail 1. The material vehicle 2 further includes a power acquisition board 27, and the linear motor supplies power to the material vehicle 2 through the power acquisition board 27, thereby driving the material vehicle 2 to move on the guide rail 1.

According to the sorting device of this embodiment, the electromagnets 11 are provided on both sides of the guide rail 1, and the permanent magnets 23 are provided on both sides of the tray 22, such that the material vehicle has two unloading states, as shown in FIG. 2c and FIG. 2d, respectively, which may allow the material vehicle 2 to unload the material to the sorting ports on both sides of the guide rail 1, thus improving the utilization of the material vehicle 2. At the same time, through the electromagnets 11 provided on both sides of the guide rail 1 and the permanent magnets 23 provided on both sides of the tray 22, the tilting of the tray 22 may be made more rapid.

According to the sorting device provided by the above embodiment of the present disclosure, the tilting of the tray may be implemented through the attraction force or the repulsive force between the magnets, which saves energy to a certain extent and reduces usage costs; the electromagnets and the permanent magnets are provided on both sides, which makes the tilting of the tray more rapid, thus improving the sorting efficiency, and at the same time, the tray is more easily to be reset after the tilting; the tray is set to have the curved surface, and the elastically telescopic pieces are evenly disposed on both sides of the center line of the tray, which makes the tray more balanced. Thus, the materials are not easily dropped during the transportation.

The above description is only an explanation for the embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A sorting device, comprising a guide rail and a material vehicle moving on the guide rail,
   wherein a plurality of sorting ports are provided on both sides of the guide rail, and at least one electromagnet is provided at a position of the guide rail corresponding to a sorting port,
   the material vehicle includes a vehicle frame, a tray, at least one magnet and at least two elastically telescopic pieces,
   the vehicle frame is used to bear the tray, the tray includes a material loading surface and is for loading materials, and the tray is rotatably connected to the vehicle frame,
   the magnet is disposed on a surface of the tray opposite to the material loading surface, and the magnet is connected to the electromagnet in an attraction way, to switch the material vehicle between a transportation state and an unloading state, and
   the elastically telescopic pieces are connected to the vehicle frame and the tray, for maintaining the transportation state or resetting the tray after the unloading state.

2. The sorting device according to claim 1, wherein the vehicle frame includes a first transverse beam and a second transverse beam disposed opposite each other,
   the first transverse beam is provided with a first support and a second support, and
   the first support is rotatably connected to the tray, and the second support is rotatably connected to the elastically telescopic pieces.

3. The sorting device according to claim 2, wherein the first transverse beam is provided with a plurality of first supports, and
   the plurality of first supports are collinear, and a plane formed by a line where the plurality of first supports are located and a center line of the guide rail is perpendicular to the first transverse beam.

4. The sorting device according to claim 3, wherein the first transverse beam is provided with a plurality of second supports, and
   the plurality of second supports are symmetrically distributed with respect to the center line of the guide rail.

5. The sorting device according to claim 2, wherein the guide rail includes a bearing surface,
   the material vehicle further includes a walking wheel, the walking wheel being fixedly connected to the first transverse beam and the second transverse beam, and the walking wheel is in contact with the bearing surface, to allow the material vehicle to move on the guide rail.

6. The sorting device according to claim 5, wherein the guide rail further includes a side surface perpendicular to the bearing surface,
   the material vehicle further includes a guide wheel, the guide wheel being fixed to the second transverse beam, and
   the guide wheel is in contact with the side surface, to allow the material vehicle to move along the guide rail.

7. The sorting device according to claim 2, wherein an even number of electromagnets are disposed at positions of the guide rail corresponding to the sorting ports,
   the even number of electromagnets are evenly distributed on both sides of the guide rail, and
   the electromagnets are connected to a power supply.

8. The sorting device according to claim 7, wherein the material vehicle includes a plurality of permanent magnets, and
   the plurality of permanent magnets are symmetrical with respect to the center line of the guide rail.

9. The sorting device according to claim 2, wherein the material loading surface is a curved surface, and the curved surface is symmetrical along a cross section perpendicular to the center line of the guide rail with respect to the center line of the guide rail.

10. The sorting device according to claim 3, wherein the material loading surface is a curved surface, and the curved surface is symmetrical along a cross section perpendicular to the center line of the guide rail with respect to the center of the guide rail.

11. The sorting device according to claim 4, wherein the material loading surface is a curved surface, and the curved surface is symmetrical along a cross section perpendicular to the center line of the guide rail with respect to the center line of the guide rail.

12. The sorting device according to claim 1, wherein the material loading surface is a curved surface, and the curved surface is symmetrical along a cross section perpendicular to the center line of the guide rail with respect to the center line of the guide rail.

13. The sorting device according to claim 1, wherein a linear motor is disposed in the guide rail, and the material vehicle further includes a power acquisition board, and
    the linear motor supplies power to the material vehicle through the power acquisition board, to drive the material vehicle to move on guide rail.

* * * * *